United States Patent
Livaich et al.

(10) Patent No.: US 11,621,429 B2
(45) Date of Patent: Apr. 4, 2023

(54) FUEL CELL COMPONENT INCLUDING SCALE-ACCOMMODATING FLOW CHANNELS

(71) Applicant: DOOSAN FUEL CELL AMERICA, INC., South Windsor, CT (US)

(72) Inventors: Eric Livaich, South Windsor, CT (US); Ke Gong, Ellington, CT (US); Timothy William Patterson, West Hartford, CT (US); Dante Misseri, Cromwell, CT (US)

(73) Assignee: HYAXIOM, INC., East Hartford, CT (US)

( * ) Notice: Subject to any disclaimer, the term of this patent is extended or adjusted under 35 U.S.C. 154(b) by 195 days.

(21) Appl. No.: 17/026,502

(22) Filed: Sep. 21, 2020

(65) Prior Publication Data
US 2022/0093939 A1   Mar. 24, 2022

(51) Int. Cl.
*H01M 8/026* (2016.01)
*H01M 8/0265* (2016.01)

(52) U.S. Cl.
CPC ......... *H01M 8/026* (2013.01); *H01M 8/0265* (2013.01)

(58) Field of Classification Search
None
See application file for complete search history.

(56) References Cited

U.S. PATENT DOCUMENTS

| | | | |
|---|---|---|---|
| 7,972,740 B2 | 7/2011 | Darling et al. | |
| 8,012,646 B2 | 9/2011 | Hatoh et al. | |
| 8,309,273 B2 | 11/2012 | Gemba et al. | |
| 8,778,554 B2 | 7/2014 | Goto et al. | |
| 9,735,435 B2 | 8/2017 | Glandt et al. | |
| 2003/0077501 A1 | 4/2003 | Knights et al. | |
| 2003/0157387 A1* | 8/2003 | Hase | H01M 8/0263 429/489 |
| 2004/0110057 A1 | 6/2004 | Yoshimoto et al. | |
| 2009/0023029 A1* | 1/2009 | Matsumoto | H01M 8/2483 429/434 |
| 2017/0317362 A1* | 11/2017 | Takehiro | H01M 8/04201 |

FOREIGN PATENT DOCUMENTS

| | | | |
|---|---|---|---|
| EP | 1659653 B1 | | 10/2014 |
| JP | 58-96670 | | 6/1983 |
| JP | 2005093244 A | * | 4/2005 |
| JP | 2010-102904 A | | 5/2010 |
| JP | 6170317 B2 | | 7/2017 |
| WO | 2014/039048 A1 | | 3/2014 |

OTHER PUBLICATIONS

International Search Report and Written Opinion of the International Searching Authority for International application No. PCT/US2021/050597 dated Dec. 7, 2021.

* cited by examiner

*Primary Examiner* — Alix E Eggerding
(74) *Attorney, Agent, or Firm* — Carlson, Gaskey & Olds, P.C.

(57) ABSTRACT

An illustrative example fuel cell component includes a plate with a plurality of flow channels in at least one side of the plate. Each of the flow channels has a length between an inlet and an outlet. Each of the flow channels has a width and a depth, which are transverse to the length. At least some of the flow channels include a portion near the inlet and the width or the depth of the portion is greater than the width or depth along a majority of the length of those flow channels.

20 Claims, 2 Drawing Sheets

FUEL CELL COMPONENT INCLUDING SCALE-ACCOMMODATING FLOW CHANNELS

BACKGROUND

Fuel cells generate electricity based on an electrochemical reaction between reactants such as hydrogen and oxygen. Fuel cell devices include a number of fuel cells in a cell stack assembly. One issue associated with liquid electrolyte fuel cells is managing the electrolyte within the cell stack assembly. The liquid electrolyte tends to evaporate over time. One issue associated with such evaporation is that there eventually may not be adequate electrolyte throughout the stack to keep the cell stack assembly operational. Another issue associated with liquid electrolyte evaporation is a scale of salt and mineral deposits may build up and interfere with proper flow of reactants within the cell stack assembly.

SUMMARY

An illustrative example fuel cell component includes a plate with a plurality of flow channels in at least one side of the plate. Each of the flow channels has a length between an inlet and an outlet. Each of the flow channels has a width and a depth that are each transverse to the length. At least some of the flow channels include a portion near the inlet and the width or the depth of the portion is greater than the width or depth along a majority of the length of those flow channels.

In an example embodiment having one or more features of the fuel cell component of the previous paragraph, the greater width or depth establishes a depository in the portion near the inlet of the at least some of the flow channels and the depository is configured to contain scale resulting from liquid electrolyte evaporation.

In an example embodiment having one or more features of the fuel cell component of any of the previous paragraphs, the portion extends along less than one-tenth of the length.

In an example embodiment having one or more features of the fuel cell component of any of the previous paragraphs, the at least some of the flow channels include a second portion near the outlet and the width or depth of the second portion is greater than the width or depth along the majority of the length of the at least some of the flow channels.

In an example embodiment having one or more features of the fuel cell component of any of the previous paragraphs, all of the flow channels include the portion and the second portion.

In an example embodiment having one or more features of the fuel cell component of any of the previous paragraphs, the flow channels have a rectangular cross-section along the majority of the length and the portions have a stepped profile cross-section.

In an example embodiment having one or more features of the fuel cell component of any of the previous paragraphs, the depth of each portion is greater than the depth along the majority of the length of the at least some of the flow channels, the width of each portion varies from a first width near the one side of the plate to a second width near a deepest part of the portion, and the second width is smaller than the first width.

In an example embodiment having one or more features of the fuel cell component of any of the previous paragraphs, the width varies in a stepped manner.

In an example embodiment having one or more features of the fuel cell component of any of the previous paragraphs, the flow channels have the first width along the majority of the length.

In an example embodiment having one or more features of the fuel cell component of any of the previous paragraphs, the depth of each portion is greater than the depth along the majority of the length of the at least some of the flow channels, the inlet is at one edge of the plate, the depth of each portion varies, and the depth of each portion is greatest adjacent the one edge of the plate.

In an example embodiment having one or more features of the fuel cell component of any of the previous paragraphs, each portion includes a bottom surface, the depth of the portion is defined between the bottom surface and the one side of the plate, the bottom surface is furthest from the one side of the plate adjacent the one edge of the plate, and the bottom surface is at an oblique angle relative to the one side of the plate.

In an example embodiment having one or more features of the fuel cell component of any of the previous paragraphs, the width of each portion is greater than the width along the majority of the length of the at least some of the flow channels.

In an example embodiment having one or more features of the fuel cell component of any of the previous paragraphs, every flow channel includes one of the portions near the inlet.

An illustrative example embodiment having one or more features of the fuel cell component of any of the previous paragraphs includes a second portion near the outlet of at least some of the flow channels and the second portion has a width or a depth that is greater than the width or depth along the majority of the length of the at least some of the flow channels.

In an example embodiment having one or more features of the fuel cell component of any of the previous paragraphs, the portion has a dimension along the length of the flow channel that is less than 25 mm (1 inch).

An illustrative example embodiment of a fuel cell includes the fuel cell component of any of the previous paragraphs.

An illustrative example embodiment of a fuel cell stack assembly includes a plurality of the fuel cells of the previous paragraph.

An illustrative example embodiment of a power plant includes a plurality of the fuel cell stack assemblies of the previous paragraph.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention facilitate enhanced fuel cell operation over time by including features that accommodate potential scale build up resulting from liquid electrolyte evaporation. In example embodiments described below, reactant flow channels include portions having at least one dimension selected to establish a depository for scale build up in that portion to reduce how such scale may otherwise interfere with reactant flow.

Figure 1:
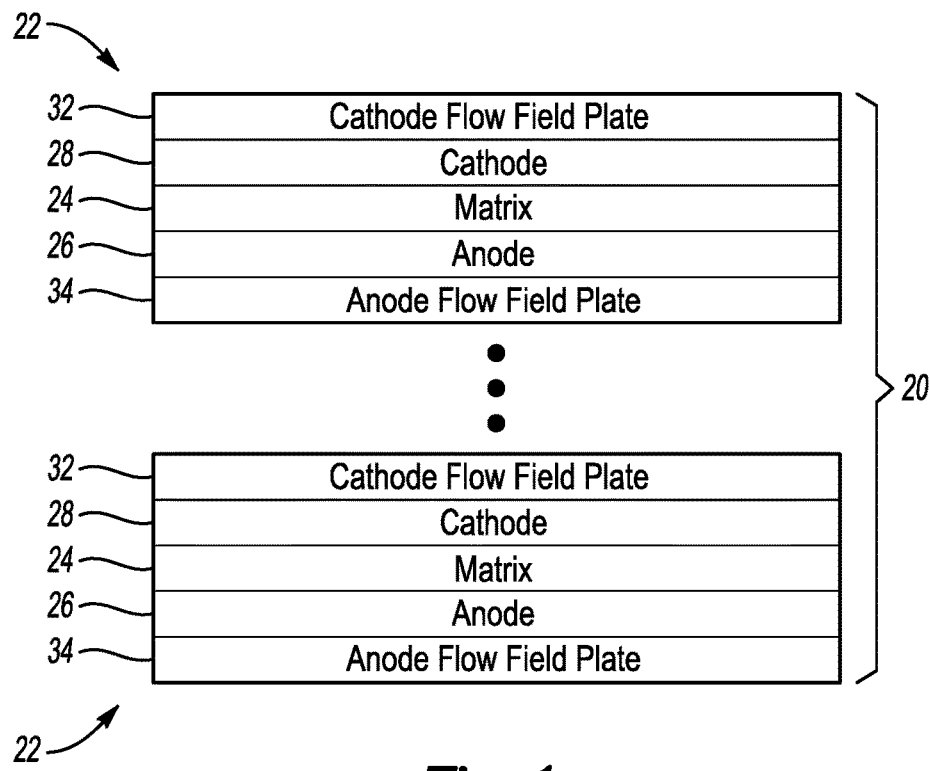
FIG. 1 schematically illustrates a fuel cell stack assembly.

FIG. 1 schematically illustrates selected features of a fuel cell stack assembly 20 including a plurality of fuel cells 22. Each fuel cell includes a matrix 24 containing a liquid electrolyte, such as phosphoric acid. An anode electrode 26 is on one side of the matrix 24 and a cathode electrode 28 is on an opposite side of the matrix 24. The cell stack assembly 20 includes a plurality of cathode flow field plates 32 and anode flow field plates 34. The flow field plates facilitate delivering reactants, such as hydrogen and oxygen, to the electrodes for generating electricity based on an electrochemical reaction. Only some of the fuel cells 22 of the cell stack assembly 20 are illustrated for discussion purposes and many embodiments will include more of such components. Fuel cell power plants include a plurality of such stacks.

Figure 2:
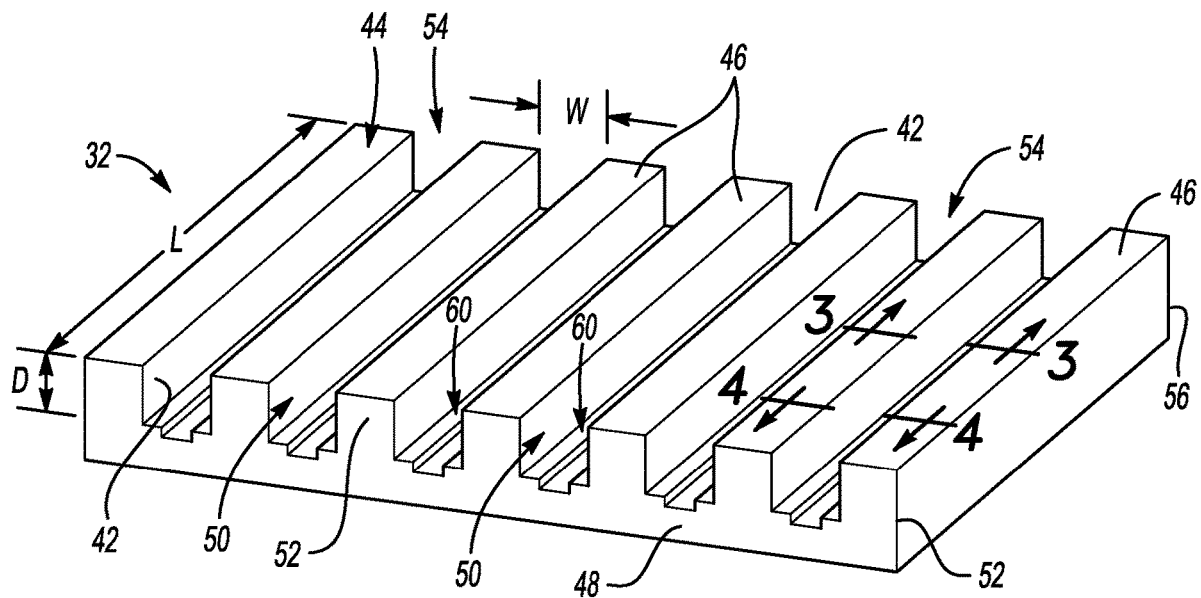
FIG. 2 illustrates a fuel cell component designed according to an example embodiment.

FIG. 2 shows the cathode flow field plate 32 separate from the cell stack assembly 20. The cathode flow field plate 32 has a planar body referred to as a plate 40. A plurality of flow channels 42 for directing oxygen to the cathode electrode 28 are open to one side 44 of the plate 40. The flow channels 42 are separated from each other by ribs 46. A web 48 serves to separate the flow channels 42 from the cell stack assembly component on the opposite side of the plate 40, which is the underside in the illustration. In some embodiments, the plate 40 includes other flow channels on the opposite side.

The flow channels 42 each have an inlet 50 near one edge 52 of the plate 40 and an outlet 54 near another edge 56 of the plate 40. A length L of each flow channel 42 extends along the entirety of the plate 40 between the inlet 50 and the outlet 54 in this example embodiment. Each flow channel 42 also has a width W that is transverse to the length L and parallel to the one side 44 of the plate 40 and a depth D that is transverse to the length L and width W.

At least some of the flow channels 42 include a portion 60 near the inlet 50. The portion 60 includes at least one dimension that is different than the corresponding dimension of a majority of the flow channel 42. The different dimension of the portion 60 establishes a different cross-sectional area or channel volume per unit length in the portion 60 compared to the majority of the flow channel 42.

Figure 3:
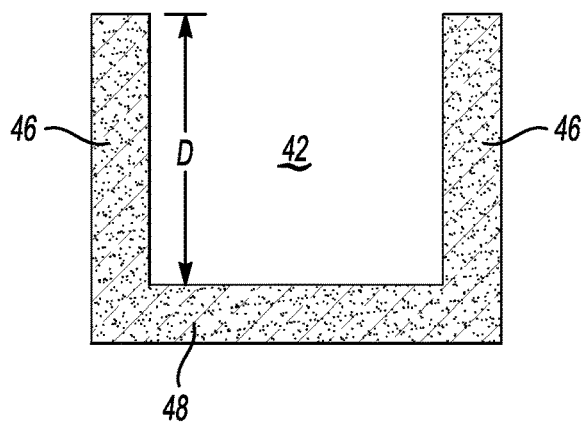
FIG. 3 is a cross-sectional illustration taken along the lines 3-3 in FIG. 2.
Figure 4:
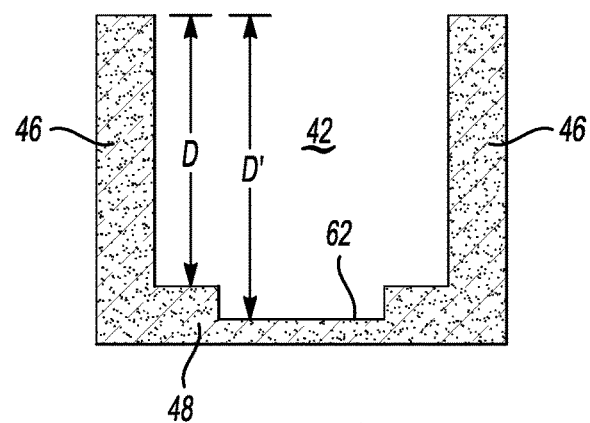
FIG. 4 is a cross-sectional illustration taken along the lines 4-4 in FIG. 2.

In the embodiment of FIGS. 2-4, the portion 60 includes a second depth D' that is greater than the depth D of the majority of the flow channel 42. As can be appreciated from FIG. 3, the majority of the length of each flow channel in this embodiment has a rectangular cross-section with the depth D. The portion 60, which is shown in FIG. 4 includes the second depth D' across at least some of the width W of the portion 60. The greater second depth D' establishes a recess or depository 62 in which scale build up from evaporating liquid electrolyte may accumulate. Since the depository 62 increases the volume per unit length in the portion 60, some scale build up may be accommodated in the portion 60 without substantially decreasing the area in the flow channel 42 through which oxygen may flow.

The second depth D' extends along a length of the portion 60 and only a relatively small portion of the overall length L of the flow channel 42. In some embodiments the portion 60 extends along less than ten percent of the overall length L of the flow channel 42. In some embodiments the portion 60 has a length of about 25 mm or 1 inch.

The portion 60 and the depository 62 are located near the inlet 50 because that is an area where liquid electrolyte evaporation is more likely to occur and scale is more likely to build up. Having the depository 62 reduces the likelihood that any scale build up will accumulate in a manner that would decrease or inhibit reactant flow into the flow channel 42. Maintaining a desired flow capacity of the flow channels 42 facilitates better fuel cell performance and longer fuel cell life.

Figure 5:
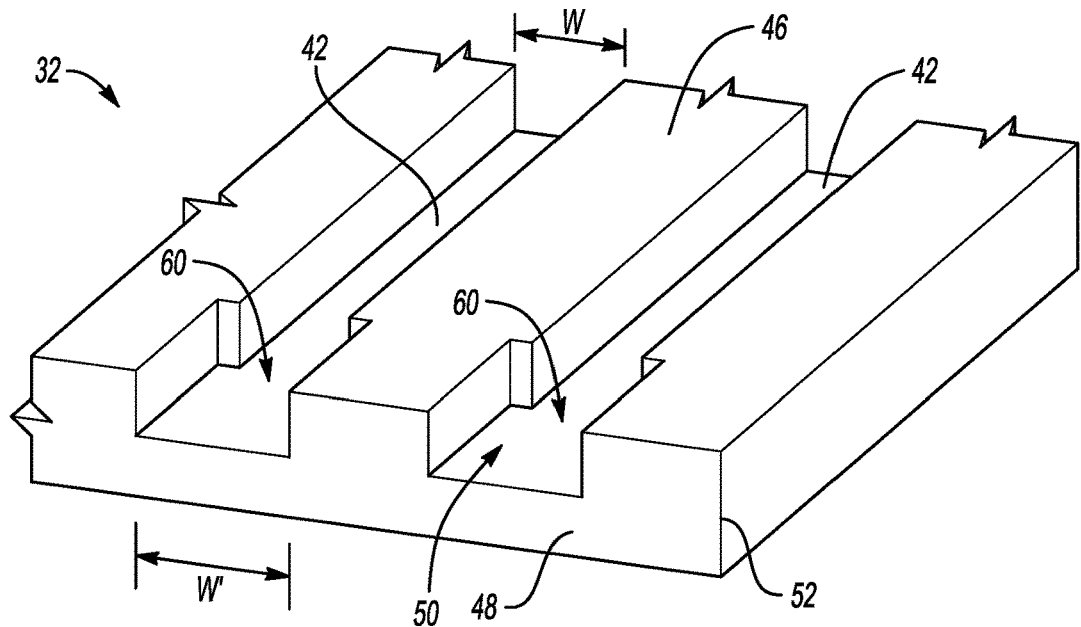
FIG. 5 is a perspective illustration showing a selected portion of a fuel cell component.

FIG. 5 shows a portion of another example cathode flow field 32. In this example embodiment, the portion 60 has the same depth D as the majority of the flow channel 42 but the width W' of the portion 60 is greater than the width W of the majority of the flow channel 42. The increased width W' provides a larger cross-sectional area in the portion 60 compared to the majority of the flow channel 42. It is possible to maintain a desired minimum flow capacity through the portion 60 even if some scale resulting from evaporating liquid electrolyte builds up over time near the inlet 50.

Other embodiments include an increased depth D' and an increased width W' within the portion 60. At least one increased dimension (i.e., depth or width) provides the larger cross-sectional area and the depository in the portion 60. A variety of configurations are possible in view of this description as the features of the example embodiments are not necessarily limited to the respective embodiments. Other embodiments include other combinations of the example features. For example, the greater depth D' shown in FIG. 2 may be combined with the greater width W' of FIG. 5.

In the example embodiments, another portion 60 is provided near the outlet 54 of at least some of the flow channels 42. The outlet 54 includes at least one dimension, such as a depth D' or width W', that is greater than the corresponding dimension along the majority of the length L of the flow channel 42. With depositories 62 near the inlet 50 and outlet 54 of the flow channels 42, the flow field plate 32 has symmetry that contributes to maintaining a desired geometry or shape of the cell stack assembly when a plurality of fuel cells including such flow field plates are assembled into a stack. Another feature of the symmetry of the example flow field plate is that the plate does not need to be rotated 180° during assembly to ensure that the depositories are on the inlet side where scale build up is most likely.

In the illustrated embodiments every flow channel 42 includes a portion 60 with a depository 62 to accommodate some scale build up over time. The way in which the second depth D' or second width W' are established in these example includes using a milling technique to form the flow channels 42. A differently sized blade is used to establish the different dimension in the portion 60 compared to a blade used to form the majority of the length L of the flow channels 42. The different dimension of the portion 60 may be formed before or after the flow channel 42 is established.

The manner in which the depositories 62 are formed may include control over the movement of the blade or tool used to mill out the portion 60 to establish a gradual transition between the different dimensions. For example, a stepped configuration is shown in FIGS. 4 and 5 but other embodiments include transition surfaces that are at an oblique angle to the length L of the flow channel 42. For example, the greater second depth D' may vary along a length of the portion 60 and gradually decrease from a maximum at the edge 52 to the depth D where the portion 60 ends. In that example, the bottom surface (according to the drawings) of the depository 62 is at an oblique angle relative to the side 44 of the plate 40.

The additional depth of the second depth D' is kept within a range that allows for sufficient plate material along the web 48 to prevent acid or reactant migration through the web 48 toward an adjacent component in the cell stack assembly 20. Similarly, any additional width W' is kept within a range that does not reduce the size of the adjacent ribs 46 below a minimum needed to withstand the pressure applied in the cell stack assembly to maintain the flow channels 42.

The cathode flow field 32 is shown and described above for discussion purposes. Other components of the cell stack assembly 20, such as the anode flow fields 34, may include scale depositories 62.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell component comprising a plate including a plurality of flow channels in at least one side of the plate, each of the flow channels having a length between an inlet and an outlet, each of the flow channels having a width transverse to the length and a depth transverse to the length, wherein at least some of the flow channels include a portion near the inlet the depth of the portion is greater than the depth along a majority of the length of the at least some of the flow channels and the width of the portion is greater than the width along a majority of the length of the at least some of the flow channels.

2. The fuel cell component of claim 1, wherein the greater width or depth establishes a depository in the portion near the inlet of the at least some of the flow channels and the depository is configured to contain scale resulting from liquid electrolyte evaporation.

3. The fuel cell component of claim 1, wherein the portion extends along less than one-tenth of the length.

4. The fuel cell component of claim 1, wherein the at least some of the flow channels include a second portion near the outlet and the width or depth of the second portion is greater than the width or depth along the majority of the length of the at least some of the flow channels.

5. The fuel cell component of claim 4, wherein all of the flow channels include the portion and the second portion.

6. The fuel cell component of claim 1, wherein the flow channels have a rectangular cross-section along the majority of the length and the portions have a stepped profile cross-section.

7. The fuel cell component of claim 1, wherein
the width of each portion varies from a first width near the one side of the plate to a second width near a deepest part of the portion, and
the second width is smaller than the first width.

8. The fuel cell component of claim 7, wherein the width varies in a stepped manner.

9. The fuel cell component of claim 7, wherein the flow channels have the first width along the majority of the length.

10. The fuel cell component of claim 1, wherein
the inlet is at one edge of the plate,
the depth of each portion varies, and
the depth of each portion is greatest adjacent the one edge of the plate.

11. The fuel cell component of claim 10, wherein
each portion includes a bottom surface,
the depth of the portion is defined between the bottom surface and the one side of the plate,
the bottom surface is furthest from the one side of the plate adjacent the one edge of the plate, and
the bottom surface is at an oblique angle relative to the one side of the plate.

12. The fuel cell component of claim 1, wherein every flow channel includes one of the portions near the inlet.

13. The fuel cell component of claim 1, comprising a second portion near the outlet of at least some of the flow channels and wherein the second portion has a width or a depth that is greater than the width or depth along the majority of the length of the at least some of the flow channels.

14. The fuel cell component of claim 1, wherein the portion has a dimension along the length of the flow channel that is less than 25 mm (1 inch).

15. A fuel cell comprising the fuel cell component of claim 1.

16. A fuel cell stack assembly comprising a plurality of fuel cells each including the fuel cell component of claim 1.

17. A power plant comprising a plurality of the fuel cell stack assemblies of claim 16.

18. A fuel cell component comprising a plate including a plurality of flow channels in at least one side of the plate, each of the flow channels having a length between an inlet and an outlet, each of the flow channels having a width transverse to the length and a depth transverse to the length, wherein at least some of the flow channels include a portion near the inlet,
wherein
the depth of each portion is greater than the depth along the majority of the length of the at least some of the flow channels,
the width of each portion varies from a first width near the one side of the plate to a second width near a deepest part of the portion, and
the second width is smaller than the first width.

19. The fuel cell component of claim 18, wherein the width varies in a stepped manner.

20. The fuel cell component of claim 18, wherein the flow channels have the first width along the majority of the length.

* * * * *